Figure 1:
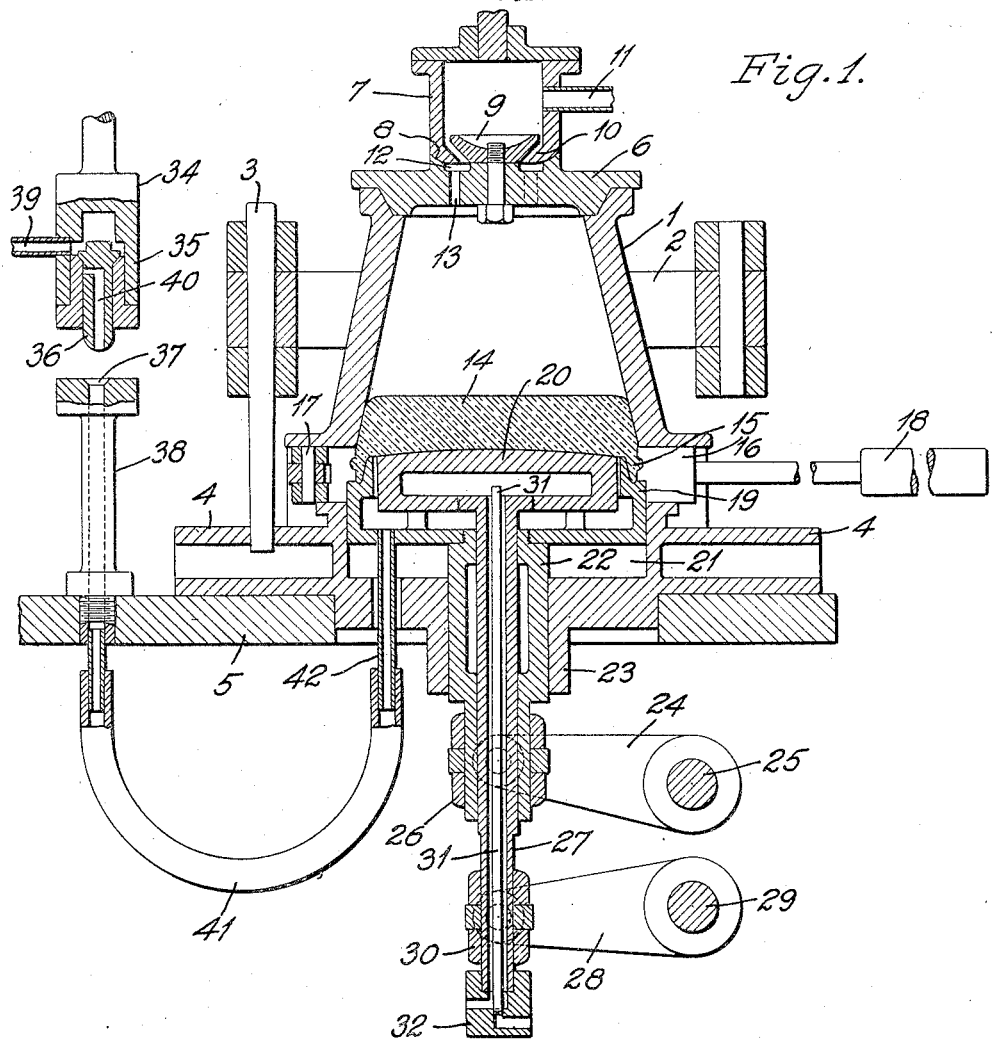

May 8, 1928.

D. P. WEAVER 1,668,993

APPARATUS FOR SHAPING GLASSWARE

Filed Feb. 2, 1926

Inventor:
David P. Weaver
by Robert D. Brown
Att'y.

Patented May 8, 1928.

1,668,993

UNITED STATES PATENT OFFICE.

DAVID P. WEAVER, OF BRIDGETON, NEW JERSEY, ASSIGNOR TO HARTFORD-EMPIRE COMPANY, OF HARTFORD, CONNECTICUT, A CORPORATION OF DELAWARE.

APPARATUS FOR SHAPING GLASSWARE.

Application filed February 2, 1926. Serial No. 85,456.

The invention relates to apparatus for shaping glassware and it has particular relation to molds for shaping wide-mouth ware of rectangular cross-section, such as battery jars and the like.

Heretofore it has been the practice to produce battery jars and other glassware having very wide mouth by pressing rather than by the blowing method, for the reason that difficulty was experienced in the latter method in forming the necessary initial blow opening or cavity in the glass of a size proportionate to that of the mouth of the ware. This was due to the fact that in order to form an opening of sufficient size it was necessary to employ a relatively broad and flat mouth-plunger, and when a plunger of such size was withdrawn from the glass, the arch of the cavity was so broad that it would collapse under the weight of the glass and destroy the cavity formed by the plunger. On the other hand, when it was attempted to produce rectangular wide mouth ware by the pressing method, difficulty was encountered in forcing the glass into the corners and upwardly into the mouth finish portion of the mold.

One of the objects of this invention is to avoid the difficulties above referred to in shaping wide-mouth ware, by providing improved apparatus by means of which a parison may be formed by the blowing method, thus insuring that the glass is forced evenly into the finish portion and corners of the blank mold.

Other objects of the invention will appear from the following description and the appended claims.

According to the present invention, a charge of glass is introduced through the open bottom of an inverted blank mold and is settle-blown to compact the glass around an elevated plunger and between this element and a neck ring. The plunger comprises an external member which cooperates with the neck ring in forming the mouth and finish of the ware, and an internal member in the form of a rectangular plate, which forms an initial blow cavity in the glass substantially coextensive with the mouth of the ware. The internal member of the plunger is then elevated an additional amount, which enlarges the cavity, and stretches the skin lining the cavity sufficiently to free the glass from adhering contact with the plunger and also to strengthen the skin enough to prevent its collapse when the plunger is withdrawn.

The internal member of the plunger is then retracted and the charge is counter-blown to form the parison. The external member of the plunger is then lowered, the mold is opened, and the parison is manually transferred to the finishing-mold or blow mold by means of the neck ring, which may remain in engagement with the glass during the blowing operation.

Figure 2:
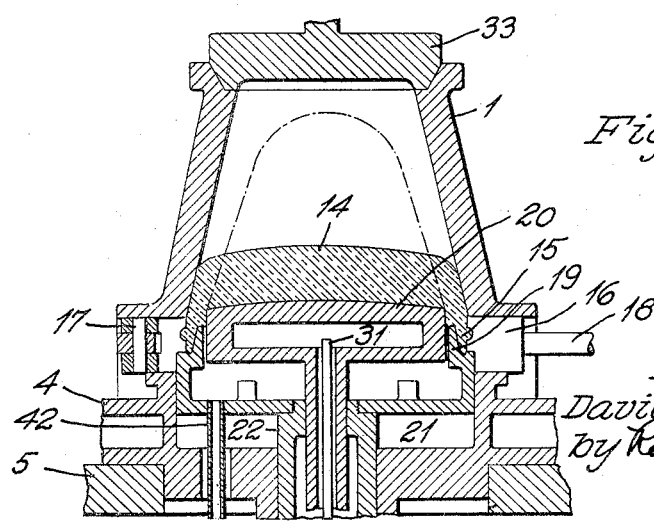

In the accompanying drawings:

Figure 1 is a vertical sectional view of an apparatus constructed according to the invention and showing a charge of glass after being settle-blown and compacted between the neck ring and the plunger; and Fig. 2 is a similar view of part of the same apparatus, illustrating the internal member of the plunger in an elevated position.

Referring to the drawings, the halves or sections of an inverted blank or parison mold 1 of rectangular cross-section are shown as being mounted upon arms 2 which are pivotally mounted on a hinge pin 3. This pin is carried by a base plate 4 which is detachably mounted on a table or other support 5. The upper end or bottom of the mold is closed after a charge of glass is deposited therein, by a blowhead 6 through which settle blowing pressure is applied. The blowhead 6 is raised and lowered and air under pressure is supplied thereto by a valve comprising a casing 7 which is provided with a beveled lower edge 8 for engagement with a correspondingly shaped seat formed in the upper face of the blowhead. The casing 7 is attached to the blowhead for a limited amount of vertical movement by a conical valve member 9 which is secured to the blowhead 6 and is adapted to engage a seat 10 provided within the casing 7. Sufficient clearance or play is provided between the casing 7 and its seat, and between the valve 9 and its seat 10, so that when the casing is in its lowermost position, air under pressure, which is admitted to the casing 7 through a pipe 11, may flow between the valve member 9 and its seat and thence through an annular passage 12 and ports 13 formed in the blowhead 6, into the mold 1 to settle-blow the charge 14 therein. When the bottom plate is raised by the upward movement of the casing 7, the valve member 9 interrupts communication between the casing and the passages 12 and 13.

The external configuration of the mouth of the jar is imparted by a neck ring 16 which is formed in sections and hinged together at 17 and which is engaged by the mold sections when closed and maintained accurately positioned thereby. The neck ring 16 may be manually lifted to transfer the parison to the blow mold, and the sections thereof opened to disengage the blown jar, by handles 18.

The internal configuration is imparted to the mouth of the parison and an initial blow opening is formed therein by a two-part plunger, comprising a member 19 of box-like structure and a plate 20 mounted for vertical movement therein. The member 19 is mounted for vertical movement in a recess 21 provided in the base plate 4 and is secured to the upper end of a sleeve 22 which extends through the base plate 4 and the table 5 and is slidably mounted in a bearing 23. The sleeve 22 is raised and lowered by an arm 24 which is fixed to a rock shaft 25 and which pivotally engages a collar 26 which is adjustably secured to the lower end of the sleeve 22.

The plate 20 of the plunger is of hollow construction and is carried by a tubular stem 27 which extends slidably through the sleeve 22. The stem 27 and plate 20 carried thereby are raised and lowered independently of the member 19 by an arm 28 which is fixed to a rock shaft 29 and which pivotally engages a collar 30 adjustably secured to the lower end of the stem 27.

The plate 20 is cooled by a cooling medium introduced through the tube 27 and which escapes through a pipe 31 mounted in a head 32 carried by the lower end of the stem 27.

At the conclusion of the settle blowing operation the cavity in the mold charge formed by the members 19 and 20 (Fig. 1) is enlarged and the glass is freed from the plate 20 by elevating the plate still further (Fig. 2). The separation of the glass from the plate 20 is presumably caused by a lateral sliding motion of the glass on the plunger when the latter is raised. This raising of the plunger 20 stretches the skin of chilled glass lining the cavity and causes the skin to further set and support the glass above it when the plate is retracted.

The plate 20 is then lowered, the bottom of the mold is closed by a baffle plate 35 (Fig. 2) and counterblowing air is applied. This air is supplied through a valve 34 which consists of a vertically movable casing 35 and a valve member 36 slidably mounted therein. When the valve is lowered the lower end of the member 36 which extends a slight distance below the lower surface of the casing 35, engages a seat 37 formed in the upper end of a tubular member 38 carried by the table 5. Continued downward movement of the casing 35 establishes communication from an air supply pipe 39 to a passageway 40 provided in the valve member 36. The lower end of the tubular member 38 communicates with a flexible pipe 41 which in turn communicates with the interior of the mouth-forming member 19 through a nipple 42. Sufficient clearance is provided around the plate 20 to permit counterblowing air to enter the cavity formed in the glass and blow the charge in the blank mold.

As soon as the parison is completely blown, the valve casing 35 is raised, permitting the valve 36 to descend under the action of gravity and interrupt the flow of air. The baffle plate 33 is then raised and the internal mouth finishing member 19, together with the plate 20, are lowered out of engagement with the parison. The mold is then opened and the parison is transferred manually to the blow mold by the neck ring or external mouth finishing members 16 which remain in engagement with the ware and which are released by the opening of the mold sections.

The illustrated embodiment of the invention may be modified in construction and arrangement without departing from the scope of the invention as set forth in the appended claims.

I claim as my invention:

1. Apparatus for shaping a parison for wide mouth glassware, comprising a mold, an external mouth finishing member associated therewith, an internal mouth finishing member cooperating with said external member, a plate mounted for vertical movement in said internal member, and means for independently raising and lowering said internal member and said plate.

2. Apparatus for shaping a parison for wide mouth ware, comprising a mold, an external and an internal mouth finishing member associated therewith, a plate mounted for vertical movement in said internal member, means for compacting a charge of molten glass in said mold and between said external and internal members, to form the finish of the ware and an initial blow opening therein, means for elevating said plate to stretch the skin of chilled glass lining said opening and to free the glass from said plate, and means for counterblowing said charge in said mold.

3. Apparatus for shaping a parison for wide mouth ware comprising a mold, an external mouth finishing member associated therewith, an internal mouth finishing member of box-like structure mounted for vertical movement in said mold, a plate of hollow structure mounted for vertical movement in said internal member, means for compacting a charge of molten glass in said mold and between said external and internal members to form the finish of the parison and an initial blow opening therein, means for independently raising and lowering said internal member and said plate, means for supplying counter-blowing air to said mold through said internal member, and means for causing a circulation of a cooling medium in said plate.

Signed at Salem, N. J., this 27 day of Jan., 1926.

DAVID P. WEAVER.